US009257868B2

(12) United States Patent
Chuah et al.

(10) Patent No.: US 9,257,868 B2
(45) Date of Patent: Feb. 9, 2016

(54) INTEGRATED POWER SYSTEM CONTROL METHOD AND RELATED APPARATUS WITH ENERGY STORAGE ELEMENT

(75) Inventors: Christopher James Chuah, Schenectady, NY (US); Herman Lucas Norbert Wiegman, Niskayuna, NY (US); Donald Wayne Whisenhunt, Jr., Niskayuna, NY (US); Roger Neil Bull, Needwood (GB); Kalyan Bukkasamudram, Bangalore (IN); Connor Brady, Needwood (GB); Mark Gotobed, Burnt Hills, NY (US)

(73) Assignee: General Electric Company, Schenectady, NY (US)

(*) Notice: Subject to any disclaimer, the term of this patent is extended or adjusted under 35 U.S.C. 154(b) by 746 days.

(21) Appl. No.: 13/548,665

(22) Filed: Jul. 13, 2012

(65) Prior Publication Data

US 2013/0099720 A1 Apr. 25, 2013

Related U.S. Application Data

(60) Provisional application No. 61/551,047, filed on Oct. 25, 2011.

(51) Int. Cl.
H02J 9/00 (2006.01)
H02J 7/00 (2006.01)
(Continued)

(52) U.S. Cl.
CPC . H02J 7/041 (2013.01); H02J 7/04 (2013.01); H02J 7/044 (2013.01); H02J 9/066 (2013.01);
(Continued)

(58) Field of Classification Search
CPC ............ H02J 9/062; H02J 9/061; H02J 9/06; H02J 9/08; H02J 7/02; H02J 3/32; H01H 2300/018; C25B 9/00; B60L 11/18; H01M 8/18; B60K 6/26
USPC .............. 307/64, 66, 43, 82, 86, 80; 320/150, 320/137, 109; 903/906, 907; 204/266, 278
See application file for complete search history.

(56) References Cited

U.S. PATENT DOCUMENTS 7,091,626 B2 8/2006 Bluemel et al.
2004/0138785 A1 7/2004 Emori et al.
(Continued)

FOREIGN PATENT DOCUMENTS

WO 2007016661 A2 2/2007
WO 2008117732 A1 10/2008

OTHER PUBLICATIONS

EP Search Report issued Apr. 11, 2014 in connection with corresponding EP Patent Application No. 12189424.0.
(Continued)

Primary Examiner — Rexford Barnie
Assistant Examiner — Jagdeep Dhillon
(74) Attorney, Agent, or Firm — Dority & Manning, P.A.

(57) ABSTRACT

Systems and methods for controlling a hybrid power architecture to provide fuel or energy savings. Recharge time of an energy storage device (ESD) is reduced through the application of a controlled potential and ESD recharge time management over the life of the hybrid system through manipulation of the ESD charge state window of operation. Fuel or energy savings is achieved by controlling the partial-state-of-charge (PSOC) window of the ESD based on a recharge resistance profile of the ESD and by controlling a charging potential applied to the ESD based on a recharge current and/or the estimated recharge resistance profile of the ESD.

18 Claims, 11 Drawing Sheets

(51) Int. Cl.
*H02J 7/04* (2006.01)
*H02J 9/06* (2006.01)
*H02J 7/14* (2006.01)
*H02J 15/00* (2006.01)

(52) U.S. Cl.
CPC .. *H02J 7/14* (2013.01); *H02J 15/00* (2013.01); *Y02B 10/72* (2013.01); *Y10T 307/625* (2015.04); *Y10T 307/696* (2015.04)

(56) References Cited

U.S. PATENT DOCUMENTS

| | | |
|---|---|---|
| 2007/0100503 A1 | 5/2007 | Balan et al. |
| 2007/0138006 A1* | 6/2007 | Oakes ............... B60L 8/00 204/278 |
| 2008/0169138 A1* | 7/2008 | Grand ............... B60K 6/48 180/65.265 |
| 2009/0109046 A1 | 4/2009 | Gielniak |
| 2009/0195074 A1 | 8/2009 | Buiel |
| 2011/0082598 A1 | 4/2011 | Boretto et al. |
| 2011/0163722 A1 | 7/2011 | Gale et al. |
| 2012/0153726 A1* | 6/2012 | Moon ............... H02J 3/32 307/46 |
| 2012/0153902 A1* | 6/2012 | Yebka ............... H02J 7/0075 320/148 |

OTHER PUBLICATIONS

European search report issued in connection with EP Application No. 12189424.0 dated Jul. 24, 2014.

* cited by examiner

INTEGRATED POWER SYSTEM CONTROL METHOD AND RELATED APPARATUS WITH ENERGY STORAGE ELEMENT

This U.S. patent application claims priority to and the benefit of U.S. provisional patent application Ser. No. 61/551,047 filed on Oct. 25, 2011, which is explicitly incorporated herein by reference.

BACKGROUND

1. Technical Field

Embodiments of the subject matter disclosed herein relate to hybrid generator-battery systems and methods. Other, embodiments of the subject matter disclosed herein relate to control methods providing fuel savings for hybrid generator-battery systems.

2. Discussion of Art

Battery applications are typically divided into two categories, backup and hybrid. The backup category relates to applications in which the battery is used as a backup power source in case of main power source failure. The hybrid category relates to applications in which the battery undergoes continual (or in some cases, periodic) charge and discharge operation in concert with a main power source.

Telecom operators in areas where grid power is unavailable or only intermittently available have relied on diesel generators to power base transceiver stations (BTS). While inexpensive to install, the escalating cost of diesel fuel, and its delivery to remote locations, has driven the search for alternative solutions with lower total cost of ownership. Fuel usage can be dramatically reduced by use of a diesel-battery hybrid power system. In such a scenario, a long life cycle battery is used to alternately share the load with the diesel generator. The diesel generator is modulated on and off and, when it is active, powers the BTS and recharges the battery at an overall higher efficiency than if powering the BTS only. Once the battery is recharged, the generator can be turned off and the battery is used to sustain the BTS load. Fuel savings of up to 50% have been achieved in some applications. Such hybrid systems may be used in other stationary power applications as well such as, for example, mining operations. Reduced fuel consumption directly impacts the operational expenditures of telecom sites and cuts greenhouse gas emissions. Hybrid systems may also be applied in mobile applications such as automobiles where an onboard generator is cycled on and off to maintain the charge or energy state of a battery. Other stationary or mobile applications are possible as well.

For typical engine and generator sets used in telecom base stations, as the load fraction increases so does the efficiency of the engine and generator set. Load fraction=battery recharge power plus the base load divided by the rating of the generator source. Therefore, fuel savings is proportional to base load times battery discharge event time energy discharged divided by the sum of battery discharge event time plus battery recharge event time.

Even with the success of the hybrid generator-battery systems in reducing fuel costs, it is still desirable to further improve fuel savings over the potential life of the equipment in such hybrid generator-battery systems.

BRIEF DESCRIPTION

Embodiments of the present invention address the applications of a battery for hybrid installations. The value proposition in using a battery for the hybrid types of installation is maximized when the energy discharged from the battery can be recharged in the shortest time period at a relatively high rate. As the recharge period shortens and the energy delivered from the battery to the load increases per day, the subsequent load fraction of the energy source (e.g., an engine and generator set) increases.

In one embodiment, a method is provided. The method includes controlling at least one of an applied recharge potential and/or a charge state window for an energy storage device (e.g., a battery power source) in response to at least one of a monitored recharge resistance value and/or a monitored recharge current of the energy storage device, to manage a recharge time of the energy storage device. The method may further include reducing the recharge time relative to a discharge time of the energy storage device, or simply minimizing the recharge time to achieve a certain recuperation of energy into the energy storage device.

In one embodiment, a method is provided. The method includes affecting a change, over time, in a charging resistance of at least one energy storage device (e.g., a battery power source) of a hybrid power system comprising the energy storage device and at least one engine. The method further includes determining how a fuel burn rate of the at least one engine is affected by the recharge resistance change in the energy storage device, and mapping fuel burn rate of the at least one engine to a plurality of partial states-of-charge (PSOC) windows of the at least one energy storage device based on the determining. The method may further include identifying a partial state-of-charge (PSOC) window of the plurality of partial states-of-charge windows of the at least one energy storage device, based on the mapping, that reduces the fuel burn rate of the at least one engine, and operating the energy storage device over the identified PSOC window.

In one embodiment, a method is provided. The method includes estimating an effect of changing a recharge resistance of an energy storage device (e.g., a battery power source) on a fuel burn rate of an engine of a system comprising the energy storage device and the engine using a model of the system. The method further includes mapping the fuel burn rate to windows of partial states-of-charge of the energy storage device based on the estimating. The method may further include identifying a particular partial state-of charge (PSOC) window of the energy storage device, based on the mapping, that provides a minimal fuel burn rate of the engine as a function of electrical power output of a generator coupled to the engine, and operating the energy storage device over the identified PSOC window.

In one embodiment, a method is provided. The method includes determining a charge window of operation of an energy storage device (e.g., a battery power source), based at least in part on a profile of recharge resistance value vs. charge state of the energy storage device, and controlling charging of the energy storage device based on the charge window of operation.

In one embodiment, a method is provided. The method includes recharging an energy storage device (e.g., a battery power source) by applying a first recharge potential to the energy storage device when a recharge resistance value of the energy storage device is below a resistance threshold value (or, equivalently, when a recharge current value is above a current threshold value). The method further includes continuing to recharge the energy storage device by applying a second recharge potential to the energy storage device that is lower than the first recharge potential when the recharge resistance value of the energy storage device is above the resistance threshold value (or, equivalently, when the recharge current value is below the current threshold value).

The method may instead include discharging the energy storage device when the recharge resistance value of the energy storage device is above the resistance threshold value (or, equivalently, when the recharge current value is below the current threshold value).

In one embodiment, a system is provided. The system includes an energy storage device (e.g., a battery power source) configured to store DC electrical power and provide DC electrical power to a DC load. The system further includes a regulator operatively connected to the energy storage device and configured to convert AC electrical power, from an AC electrical power source, to DC electrical power and provide the DC electrical power to the energy storage device and/or to the DC load. The AC electrical power source may include an electrical generator driven by a rotating mechanism. For example, the AC electrical power source may include an engine and generator set that is configured to generate AC electrical power. Other types of AC electrical power sources may be possible as well, in accordance with various other embodiments. The system also includes a controller in communication with the energy storage device and the regulator. The controller may be operable to store a determined profile and/or map of recharge resistance value vs. charge state of the energy storage device, and determine a charge window of operation of the energy storage device, based on the profile and/or the map, which conserves fuel used by the AC electrical power source. The controller may be further operable to cyclically turn the AC electrical power source on and off based on the charge window of operation. The controller may be further operable to determine the profile and/or map by monitoring potential and recharge current of the energy storage device during operation of the system. The controller may be further operable to direct the regulator to apply a first recharge potential to the energy storage device when a determined recharge resistance value of the energy storage device is below a resistance threshold value (or, equivalently, when a recharge current value is above a current threshold value), and direct the regulator to apply a second recharge potential to the energy storage device, which is lower than the first recharge potential, when a determined recharge resistance value of the energy storage device is above the resistance threshold value (or, equivalently, when the recharge current value is below the current threshold value). The controller may be further operable to determine a recharge resistance value of the energy storage device by monitoring potential and recharge current of the energy storage device during operation of the system.

In one embodiment, a system is provided. The system includes an energy storage device (e.g., a battery power source) configured to store DC electrical power and provide DC electrical power to a DC load. The system further includes a regulator operatively connected to the energy storage device and configured to regulate DC electrical power, from a DC electrical power source, and provide the DC electrical power to the energy storage device and/or to the DC load. The DC electrical power source may be a solar panel system or fuel cell energy system, for example. Other types of DC electrical power sources may be possible as well, in accordance with various other embodiments. The system also includes a controller in communication with the energy storage device and the regulator. The controller is operable to store a determined profile and/or map of recharge resistance value vs. charge state of the energy storage device, and determine a charge window of operation of the energy storage device, based on the profile and/or map, which conserves energy produced and/or stored by the DC electrical power source. The controller may be further operable to cyclically turn the DC electrical power source on and off based on the charge window of operation. The controller may be further operable to determine the profile or map by monitoring potential and recharge current of the energy storage device during operation of the system. The controller may be further operable to direct the regulator to apply a first recharge potential to the energy storage device when a determined recharge resistance value of the energy storage device is below a resistance threshold value (or equivalently, when a recharge current value is above a current threshold value), and direct the regulator to apply a second recharge potential to the energy storage device, which is lower than the first recharge potential, when a determined recharge resistance value of the energy storage device is above the resistance threshold value (or equivalently, when the recharge current value is below the current threshold value). The controller may be further operable to determine a recharge resistance value of the energy storage device by monitoring potential and recharge current of the energy storage device during operation of the system.

BRIEF DESCRIPTION OF THE DRAWINGS

Reference is made to the accompanying drawings in which particular embodiments of the invention are illustrated as described in more detail in the description below, in which.

DETAILED DESCRIPTION

Figure 1:
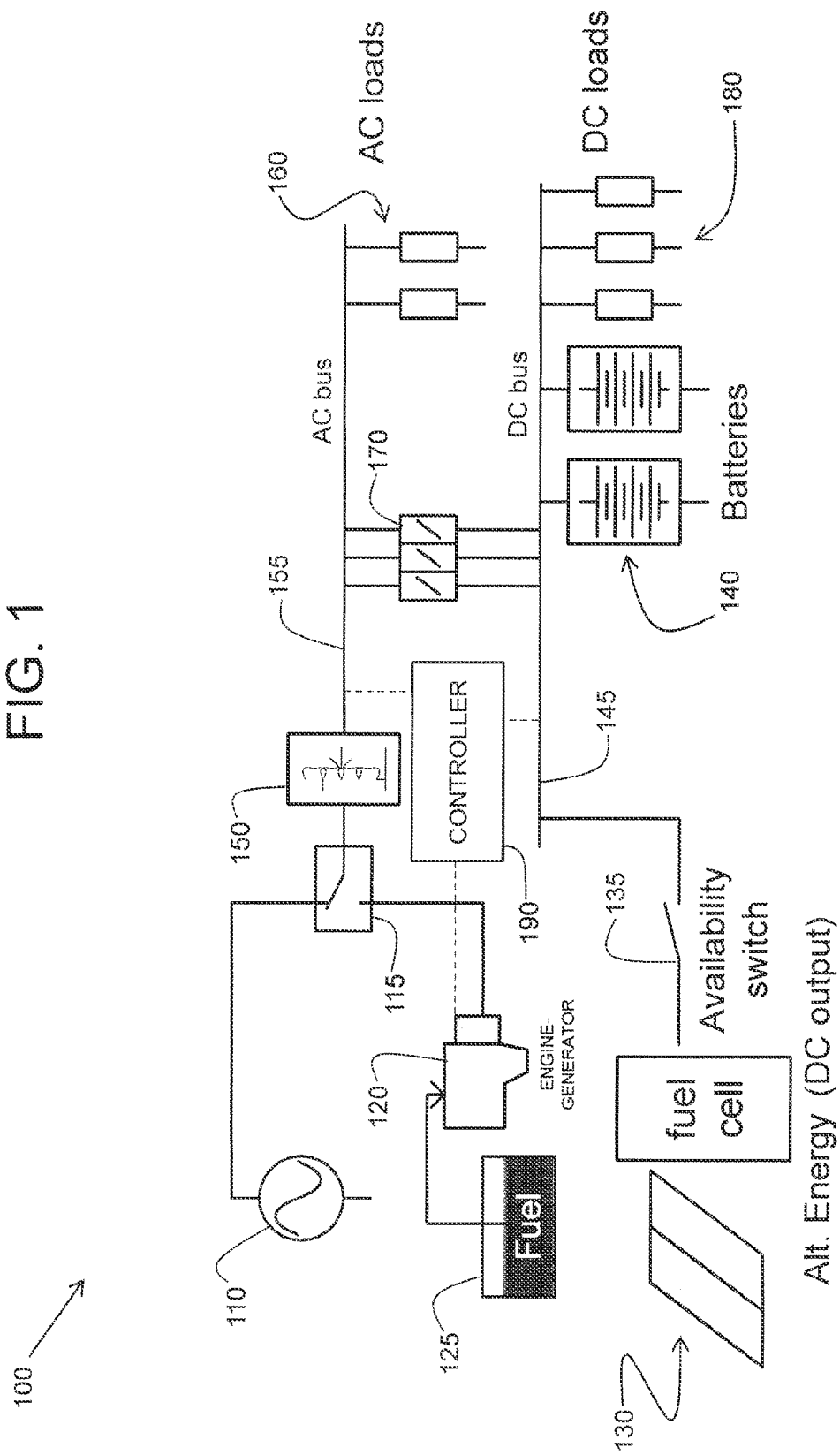
FIG. 1 is an illustration of a first embodiment of a hybrid generator-battery power system for a telecommunications application (e.g., a base transceiver station)

Embodiments of the present invention relate to improved fuel or energy savings in hybrid energy storage power systems and enable an energy storage device (e.g., a battery) in cyclic operation to be more effective at displacing run time of a primary power source (e.g., an engine-generator set) and reducing fuel or energy costs. The embodiments accomplish this by reducing recharge time of the energy storage device (ESD) through the application of a controlled potential, and/or primary power source loading, and/or battery recharge time management over the life of the system through manipulation of the charge state window of operation of the ESD. In general, fuel or energy savings of a primary power source can be increased by controlling the partial state-of-charge (PSOC) window of the ESD (e.g., a sodium metal halide type of battery) based on a recharge resistance profile of the ESD. Furthermore, fuel or energy savings can be increased by controlling a charging potential (voltage) applied to the ESD based on the observed recharge current of the ESD. Communication of either the key ESD behavioral information between an ESD unit and a primary power source (PPS) controller, or the suggested turn-on and turn-off events from the ESD unit to the PPS controller, using an adaptive control strategy, provides for optimization of the operating regime of the ESD to maximize fuel or energy savings, regardless of state of health of the ESD unit.

Embodiments of the present invention provide a means to operate an ESD that optimizes between recharge time (providing maximum fuel or energy savings) and life. The operation in this case is envisioned, for example, as a high potential recharge with no limit on recharge current when the ESD is in a low resistance state and the ESD is of sufficient health. Once the ESD reaches a predetermined resistance value or has aged to a different state of health, a signal from the ESD unit (e.g., a battery management system) is issued to initiate the discharge or lower the recharge potential if the system is not ready for ESD discharge. Other embodiments of the invention relate to a method to communicate or integrate with a master controller (e.g., a rectifier or a power interface unit, PIU) to initiate, terminate, or alter PPS operation or recharging based on the state of health of the ESD. This communication and/or integration covers a predefined algorithm loaded into the master controller, or a digital signal communicated between the ESD management system and master controller, or a direct integral communication via a communication bus (e.g., CAN or Modbus).

With reference to the drawings, like reference numerals designate identical or corresponding parts throughout the several views. However, the inclusion of like elements in different views does not mean a given embodiment necessarily includes such elements or that all embodiments of the invention include such elements. The terms "battery", "battery power source", and "energy storage element" are used interchangeably herein, are all energy storage devices, and may or may not include some form of a battery management system (BMS), in accordance with various embodiments.

FIG. 1 is an illustration of a first embodiment of a hybrid generator-battery power system 100 for a telecommunications application (e.g., a base transceiver station). This embodiment shows four possible sources of power including an AC electrical grid 110, an engine-generator power source or engine-generator set (EGS) 120, alternate energy sources (e.g., solar, wind) 130, and a battery power source 140 which is an energy storage device (ESD). A transfer switch 115 allows transfer of operation between the AC grid power source 110 and the EGS 120, as well as other alternative energy sources of AC electrical power that may be available. The EGS 120 runs on fuel (e.g., diesel fuel) provided by a fuel source 125 (e.g., a storage tank). The EGS is an AC electrical power source. Other types of AC electrical power sources are possible as well in accordance with various other embodiments such as, for example, a wind energy system. Embodiments of the present invention are configured to operate the hybrid generator-battery system 100 to minimize fuel consumption (or at least reduce fuel consumption relative to other possible modes of operation) to provide fuel savings to an operator of the system 100. An availability switch 135 allows for alternate energy sources 130, if available, to be switched in to a DC bus 145 or an AC bus 155 of the system 100.

The system 100 also includes a power interface unit (PIU) 150 that distributes AC power from the AC grid 110 or the EGS 120 to an AC bus 155. The AC bus 155 can provide AC power to drive AC loads 160 of the system such as, for example, lighting and air conditioning of a telecom base transceiver station (BTS). Furthermore, the AC bus 155 can provide AC power to a rectifier and/or a voltage regulator 170 which converts AC power to DC power and provides the DC power to the DC bus 145 to drive DC loads 180 of the system such as the radios, switches, and amplifiers of the telecom base transceiver station (BTS).

The DC bus 145 also provides DC power from the rectifier 170 to charge the battery power source 140 and provides DC power from the battery power source 140 to the DC loads 180 as the battery power source 140 discharges. The controller 190 monitor various conditions of the system 100 and communicates with the EGS 120 to turn the engine of the EGS 120 on and off in accordance with a control logic of the controller 190. In accordance with various embodiments, the controller 190 may be a separate unit, may be a part of the PIU 150, or may be a part of a battery management system (BMS) of the battery power source 140.

In accordance with other embodiments, the rectifier or regulator 170 may regulate DC power from a DC electrical power source (e.g., a solar energy system or a fuel cell energy system) instead of an AC electrical power source. The terms "rectifier" and "regulator" are used broadly herein to mean a device that conditions energy from a primary power source to provide DC electrical power to DC loads (e.g., DC loads 180) and to an ESD (e.g., the batteries 140). When the primary power source uses fuel, such as in the case of a diesel engine, a fuel savings may be achieved by employing the methods and techniques described herein. When the primary power source produces and/or stores energy such as, for example, a solar panel system, an energy savings may be achieved by employing the methods and techniques described herein. In general, a primary power source may provide AC or DC electrical power that is used by an ESD (e.g., by a DC battery power source) of the system.

Figure 2:
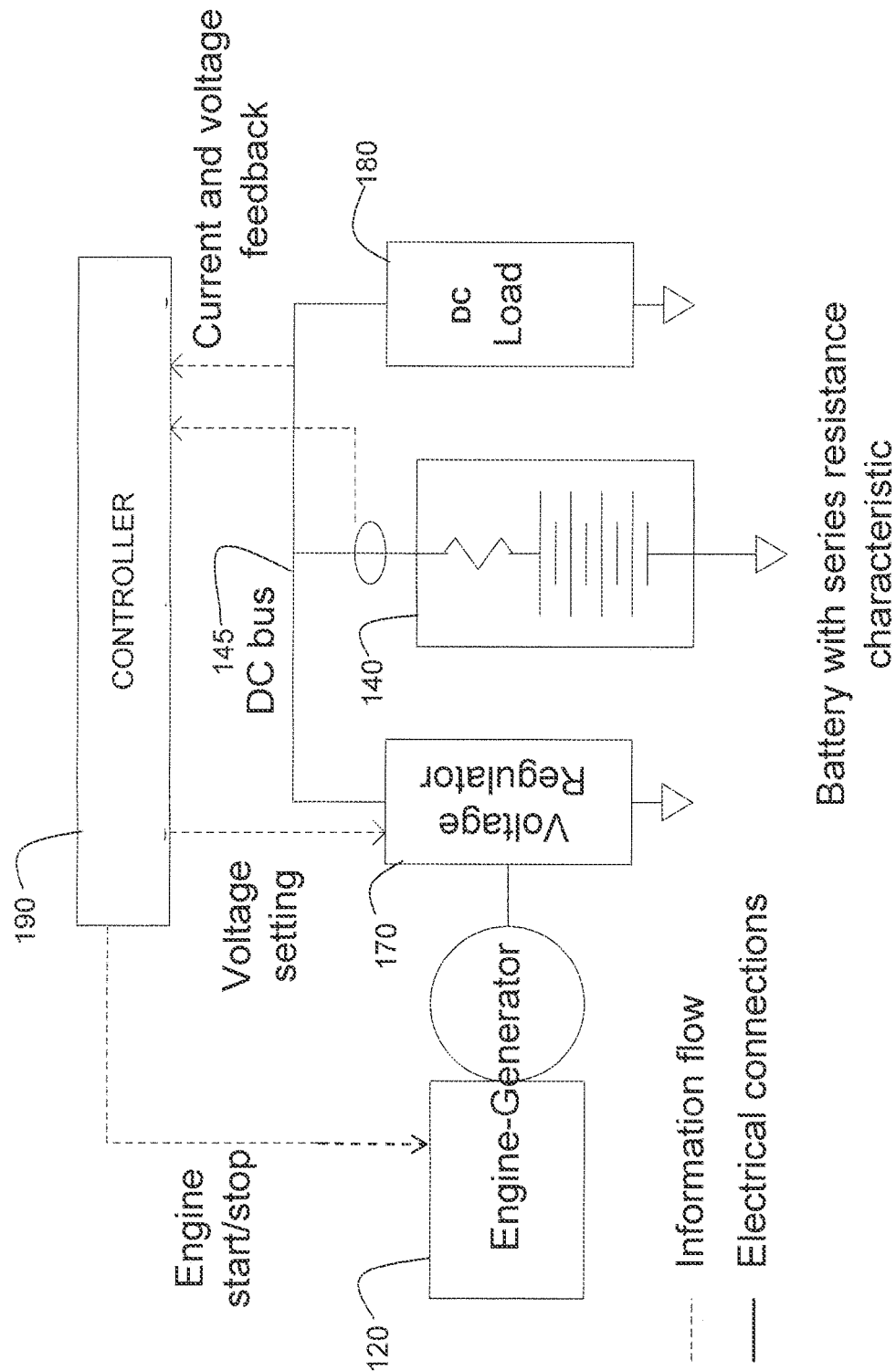
FIG. 2 is an illustration of a simplified block diagram of a portion of the hybrid generator-battery system of FIG. 1 that is configured to conserve fuel used by the engine-generator.

FIG. 2 is an illustration of a simplified block diagram of a portion of the hybrid generator-battery system 100 of FIG. 1 that is configured to conserve fuel used by the engine-generator 120. FIG. 2 shows various system elements for providing DC power to a DC load 180 using only the EGS 120 and the battery power source 140 by cycling the engine of the EGS 120 on and off in such a way so as to conserve fuel. "Conserving fuel" can mean reducing or minimizing a fuel burn rate (e.g., using less fuel or energy over a defined period of time) and/or using less fuel or energy per unit of AC electrical power generated, for example. Other meanings of "conserving fuel" may apply as well, in accordance with various embodiments of the present invention.

The controller 190 provides the control logic for operation of the system. The controller 190 may be, for example, a logic controller implemented purely in hardware, a firmware-programmable digital signal processor, or a programmable processor-based software-controlled computer. Again, the controller 190 may be a standalone unit, part of a power interface unit (PIU), part of a battery management system (BMS), or part of some other portion of an embodiment of the system.

During cyclical operation, when the EGS 120 is on, the EGS provides power to the DC load 180 and to the battery power source 140 during a charging part of the cycle. When the EGS 120 is off, the battery power source 140 provides power to the DC load 180 during a discharging part of the cycle. The state of the battery power source 140 is estimated by observations of the potential and current of the battery power source 140. Specifically the series or recharge resistance profile is learned or otherwise determined as a function of charge status. This characteristic is then monitored and updated as the battery power source 140 ages. The control methodology can reside in any controller 190 that has access to the current and voltage information of the battery power source 140, as well as access to the engine start/stop control signals.

Figure 3:
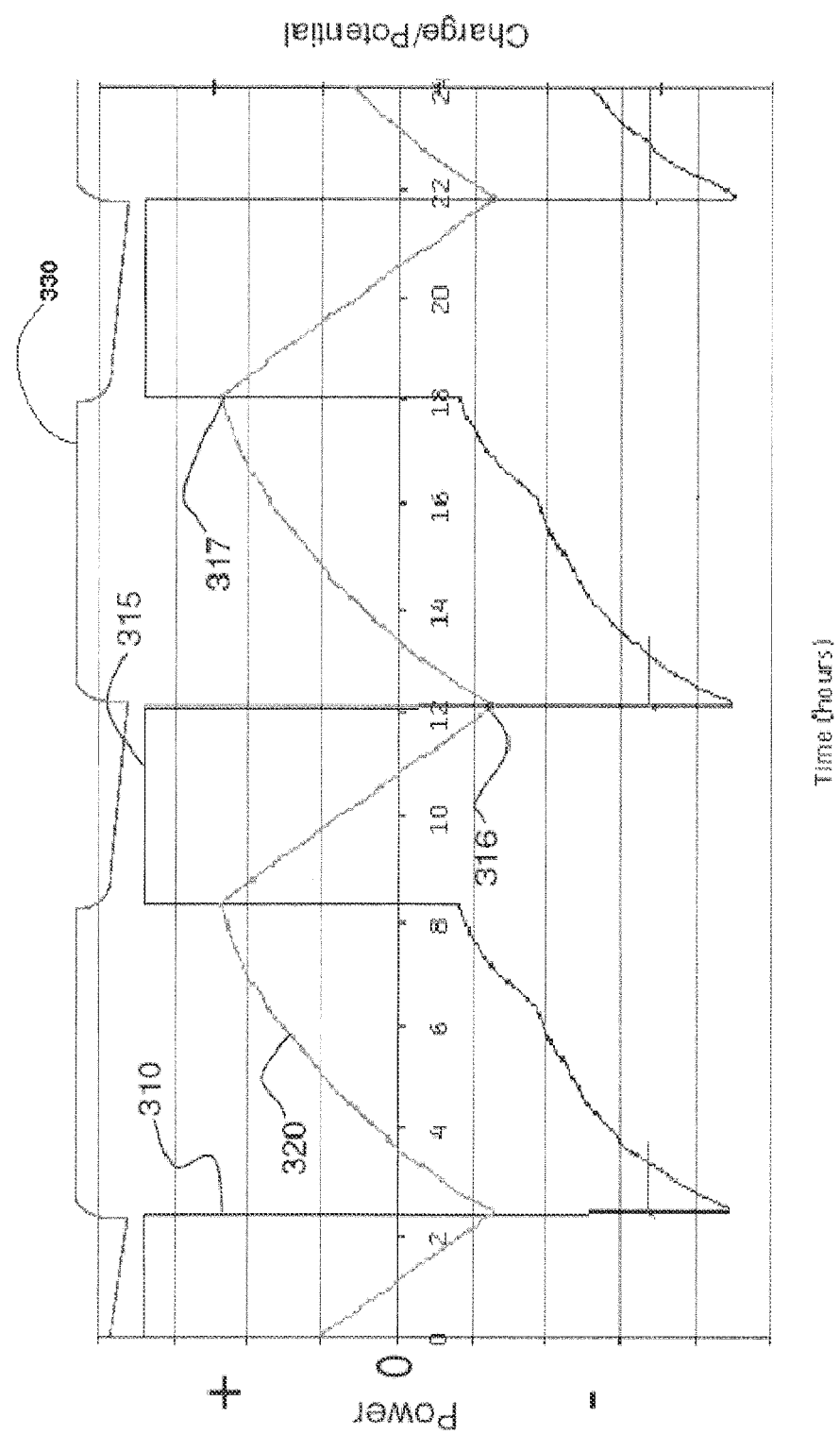
FIG. 3 provides a graphical illustration of the basic operation of a hybrid generator-battery power system such as the system shown in FIG. 2.

FIG. 3 provides a graphical illustration of the basic operation of a hybrid generator-battery power system such as the system shown in FIG. 2. The graph 310 shows power output from or input to the battery power source 140 over time, where positive power indicates battery discharge and negative power indicates battery recharge. The graph 320 shows state-of-charge (SOC) for a particular implementation of the battery power source 140 over time. The graph 330 shows the relatively steady operating voltage (e.g., −48 VDC) of the battery power source 140 over time.

When the graph 310 is maximum and flat (e.g., at level 315), the battery power source 140 is discharging its stored energy to the DC load 180 over the DC bus 145, and the engine of the EGS 120 is off. During this time, the state of charge (SOC) of the battery power source 140, as shown by graph 320, decreases as the battery discharges into the DC load 180. At a certain point 316, after the battery power source 140 has discharged a certain amount, the engine of the EGS 120 is turned on by the controller 190.

While the EGS 120 is on, the EGS 120 is both recharging the battery power source 140 and is providing power to the DC load 180 over the DC bus 145 via the regulator (rectifier) 170. During this time, the SOC of the battery power source 140 increases, as shown in graph 320 and the battery power is in the negative region of the graph 310, indicating that power is flowing into the battery power source 140. Once the battery power source 140 recharges to a certain state at point 317, the EGS 120 is turned off again and the process repeats, forming a cyclic process. By optimizing the cyclic process, fuel savings can be increased (i.e., a fuel burn rate of the EGS 120 can be decreased).

Figure 4:
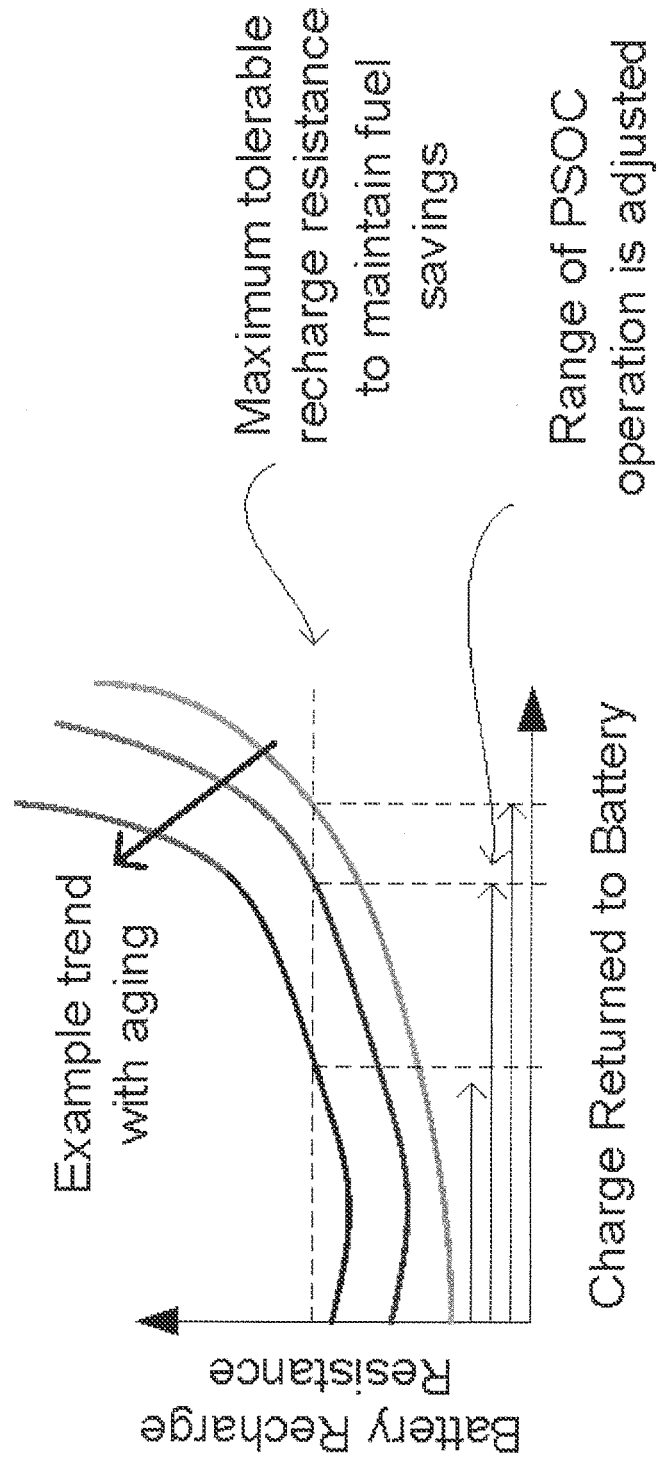
FIG. 4 provides a graph illustrating how the recharge resistance of the battery power source changes as a function of charge returned to the battery power source and age of the battery power source.

FIG. 4 provides a graph illustrating how the recharge resistance of the battery power source 140 changes as a function of charge returned to the battery power source 140 and age of the battery power source 140. In general, when a battery is in a low state of charge, the recharge resistance is low, allowing the battery to build up charge relatively quickly for a given applied charging voltage (potential). However, as the charge returned builds up in the battery, the recharge resistance of the battery increases and the rate of charging slows down, for the given applied charging voltage. Furthermore, as a battery ages, the entire curve of recharge resistance vs. charge returned tends to shift upward. As a result, the recharge resistance ends up affecting the amount of time the engine of the EGS 120 has to be on to re-charge the battery power source 140 and, the longer the EGS 120 is on, the more fuel that is burned.

In particular, for sodium metal halide type batteries, the curve representing recharge resistance vs. charge returned can be quite dynamic due to the nature of sodium metal halide type batteries. In accordance with various embodiments, the metal in a sodium metal halide type of battery may be one or more of iron, nickel, zinc, and copper. The halide may be chloride, for example. In general, sodium metal halide type of batteries provide a first-in/first-out type of operation. For example, as a sodium ion is passed into the cathode mix, the sodium ion finds the first site it can possibly bind to and proceeds to bind. As a result, recharging resistance of a sodium metal halide type of battery tends to increase as state-of-charge increases.

The recharge resistance vs. charge returned to the battery power source 140 is of keen interest to the system, as this highly effects time on recharge. Observing the recharge resistance profile will inform the engine start/stop controller 190 of the best or most desirable battery charge window. In this application, it is often the case that the battery power source 140 is operated over a small region of its total charge window. This is called partial state of charge (PSOC) operation. The EGS 120 is controlled on and off by way of certain thresholds of acceptable battery power source operating ranges. If the recharge resistance characteristic suggests that a smaller charge state window is warranted, the EGS 120 will be controlled to keep the battery power source 140 operating within the proper PSOC band. Using sodium metal halide type batteries, recharge-to-resistance profiles or functions can be used to maintain fast recharge and provide a recharge time-to-discharge time ratio that maintains fuel savings.

Figure 5:
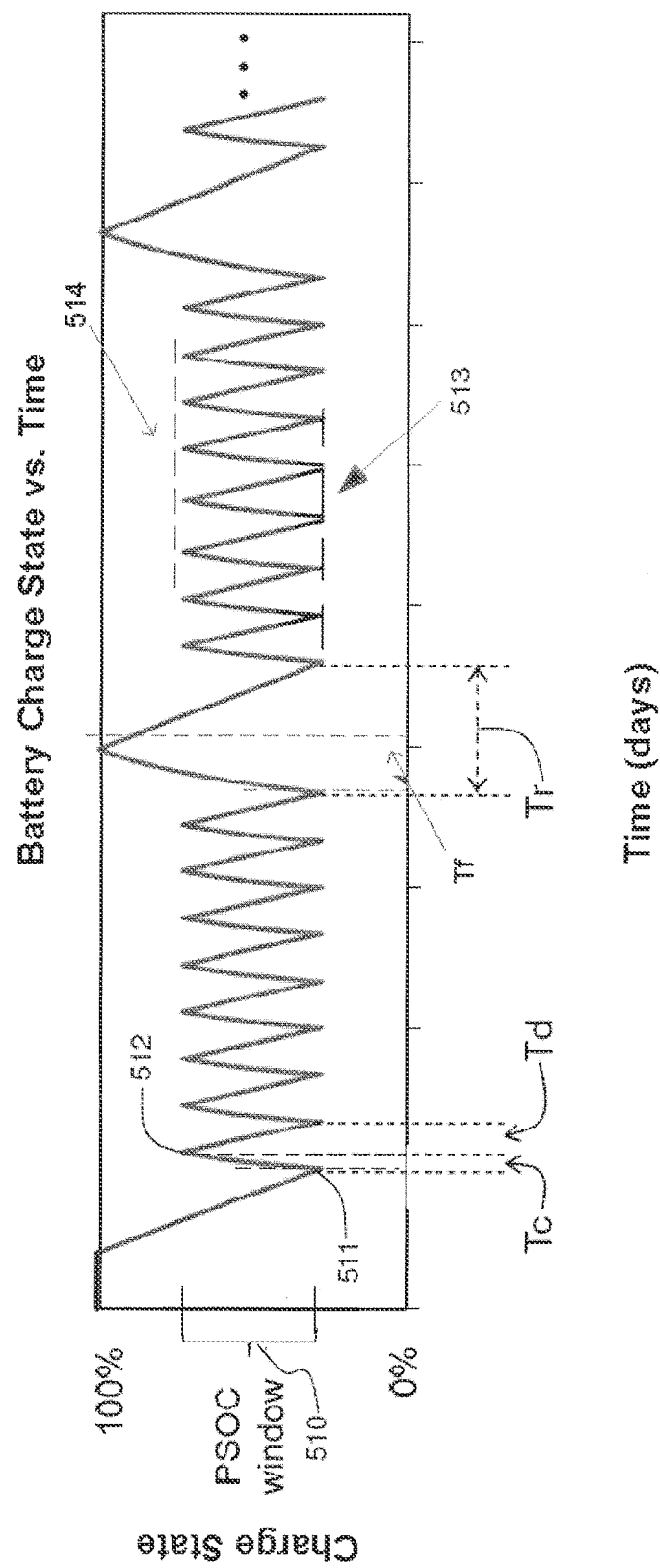
FIG. 5 provides a graph illustrating an example embodiment of a cyclical charging/discharging methodology for the hybrid generator-battery power system of FIG. 2 based on the recharge resistance characteristics of FIG. 4.

FIG. 5 provides a graph illustrating an example embodiment of a cyclical charging/discharging methodology for the hybrid generator-battery power system of FIG. 2 based on the recharge resistance characteristics of FIG. 4. The battery power source 140 is operated over the PSOC window 510 as shown in FIG. 5. For example, at setpoint 511 the battery power source 140 has discharged to a lower state-of-charge (SOC) level 513 after supplying power to the DC load 180. The state-of-charge (SOC) of the battery power source is determined by the controller 190 based on the current feedback from the battery power source 140 to the controller 190. In general, the SOC can be estimated by the controller 190 by determining the current going into and out of the battery power source 140. This may be done by implementing a charge counter functionality in the controller 190 that effectively counts charge in units of, for example, amp-hours.

The setpoint 511 defines the lower limit of the PSOC window 510 and is an indicator to the controller 190 to start the EGS 120. When the EGS 120 starts at setpoint 511, power is supplied to both the DC load 180 and to the battery power source 140 to charge the battery power source 140. The battery power source 140 is charged over a time $T_c$ until the upper setpoint 512 is reached at an upper SOC level 514, where the EGS is stopped by the controller 190. At setpoint 512, the DC load 180 is driven by the battery power source 140 as the battery power source discharges back to the lower setpoint 511 over a time $T_d$. The process then repeats such that the battery power source 140 charges and discharges over the PSOC window 510 as the engine of the EGS 120 is turned on and off by the controller 120.

In accordance with an embodiment of the present invention, the recharge resistance profile (e.g., see FIG. 4) of the battery power source 140 can be characterized by the controller 190 and used to determine the setpoints 511 and 512 of the PSOC window 510 in order to reduce the fuel consumption of the engine of the EGS 120. For example, by establishing the setpoints 511 and 512 based on the recharge resistance profile, the time to charge $T_c$ the battery power source 140 can be reduced and/or minimized, thus reducing the amount of fuel used by the EGS 120 over an extended period of time (e.g., many days). The reduction and/or minimization of the time to charge $T_c$ may be accomplished relative to the time to discharge $T_d$ the battery power source 140, for example. In general, if the recharge resistance starts getting too high to maintain fuel savings, then the PSOC window setpoints can be adapted to a narrower band (i.e., recharge and discharge over a narrower range so not as much time is spent recharging).

As an example, the lower setpoint 511 may be determined to be 30% SOC and the upper setpoint 512 may be determined to be 80% SOC (i.e., 50% PSOC window) based on the current chemistry and parasitic resistances of the battery power source 140. As the battery power source 140 ages and the recharge resistance profile drifts upward (e.g., see FIG. 4), the setpoints 511 and 512 may gradually be changed to 35% SOC and 75% SOC (i.e., 40% PSOC window), for example, reducing the charge utilization 510 in order to maintain fuel savings.

Periodically during the cyclical process, the battery power source 140 may be recharged to 100% SOC (over a full charge time $T_f$) and discharged to the lower state-of-charge (SOC) level 513 (or some other lower level) over a total reset time $T_r$ (reset event) to reset the chemistry and/or the battery management system (BMS) of the battery power source 140. In accordance with an embodiment, the controller 190 uses the time $T_r$ to re-characterize or update the recharge resistance profile of the battery power source 140.

As discussed herein, some embodiments may have multiple energy sources (e.g., solar, wind, electric grid, diesel generator) to run the electrical equipment and to charge the battery power source. The energy source used during the reset event may be prioritized between various options. Sometimes, the EGS (e.g., a diesel generator) may be the only controllable energy source, while the other energy sources may be sporadic and uncontrollable. Therefore, the controllable energy source may be used to reset the battery power source to 100% state of charge for purposes of health management. However, in accordance with an embodiment of the present invention, an energy source may be selected in a prioritized manner to reduce and/or minimize operational costs. An example of such a prioritized scheme is that of using a local and renewable energy source first, such as solar power or wind power, for recharging. Next, the electric grid supply is used if renewable energy sources are not available. Lastly, the EGS (e.g., a diesel generator) is used if the other sources are not available. Such an opportunistic reset event (due to alternate energy source availability) may help reduce prolonged diesel generator usage.

Figure 6:
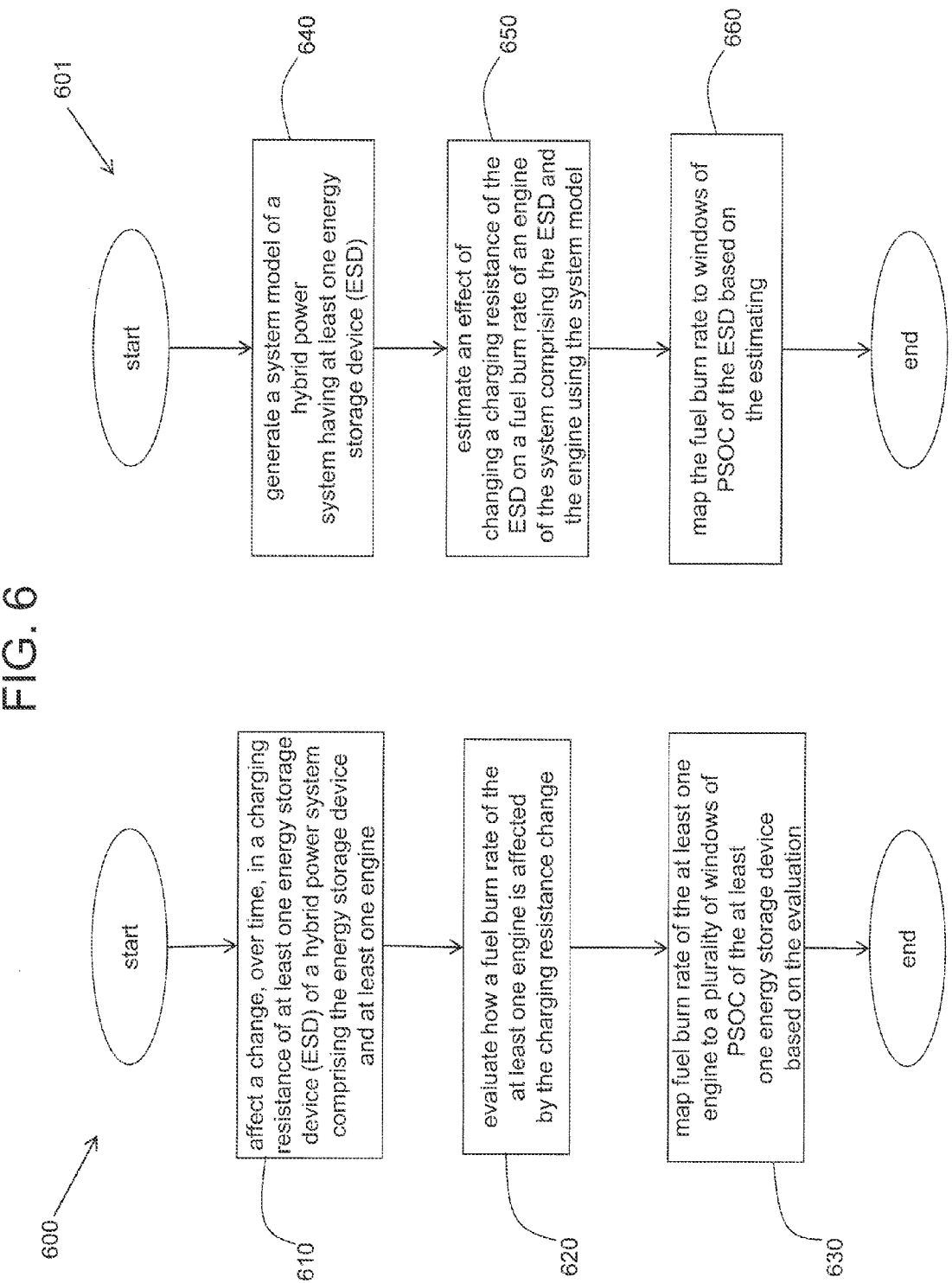
FIG. 6 illustrates two flow charts of two example embodiments of methods of adapting a partial state-of-charge (PSOC) window in a hybrid generator-battery power system to achieve generator fuel savings.

FIG. 6 illustrates two flow charts of two example embodiments of methods 600 and 601 of adapting a partial state-of-charge (PSOC) window 510 in a hybrid generator-battery power system 100 to achieve engine fuel savings. The first method 600 can be characterized as an a priori method and the second method 601 can be characterized as an on-line method.

The first method 600 comprises, as step 610, affecting a change, over time, in a charging resistance of at least one energy storage device (e.g., the battery power source 140) of a hybrid power system comprising the ESD and at least one engine. Affecting a change in a charging resistance may involve changing a state of charge of the ESD over time, for example. In step 620, the method further comprises determining how a fuel burn rate of the at least one engine is affected by the charging resistance change. Determining fuel burn rate may involve determining how much time it takes to recharge the ESD based on charging resistance and resulting charging current and, therefore, how much time the generator of the EGS spends burning fuel. In step 630, the method further comprises mapping fuel burn rate of the at least one engine to a plurality of windows of partial-state-of-charge (PSOC) of the at least one ESD based on the determining. The mapping may be stored in the system 100 and used by the controller 190 of the system 100, for example, to select a PSOC window that provides the most fuel savings based on real time charging resistance characteristics of the battery power source 140.

In step 640 of the second method 601, a system model of a hybrid power system having at least one ESD is generated. In step 650, the method comprises estimating an effect of changing a charging resistance of the ESD on a fuel burn rate of an engine of a system comprising the ESD and the engine using the model of the system. In step 660, the method comprises mapping the fuel burn rate to windows of PSOC of the ESD based on the estimating. The optimized PSOC windows can be stored in the system 100 and selected by the controller 190 based on real time charging resistance characteristics of the ESD (e.g., the battery power source 140) to select the PSOC window that provides the most fuel savings (e.g., identifying a particular partial state-of-charge (PSOC) window of the energy storage device, based on the mapping, that has a minimal fuel burn rate of the engine as a function of electrical power output of a generator coupled to the engine).

Figure 7:
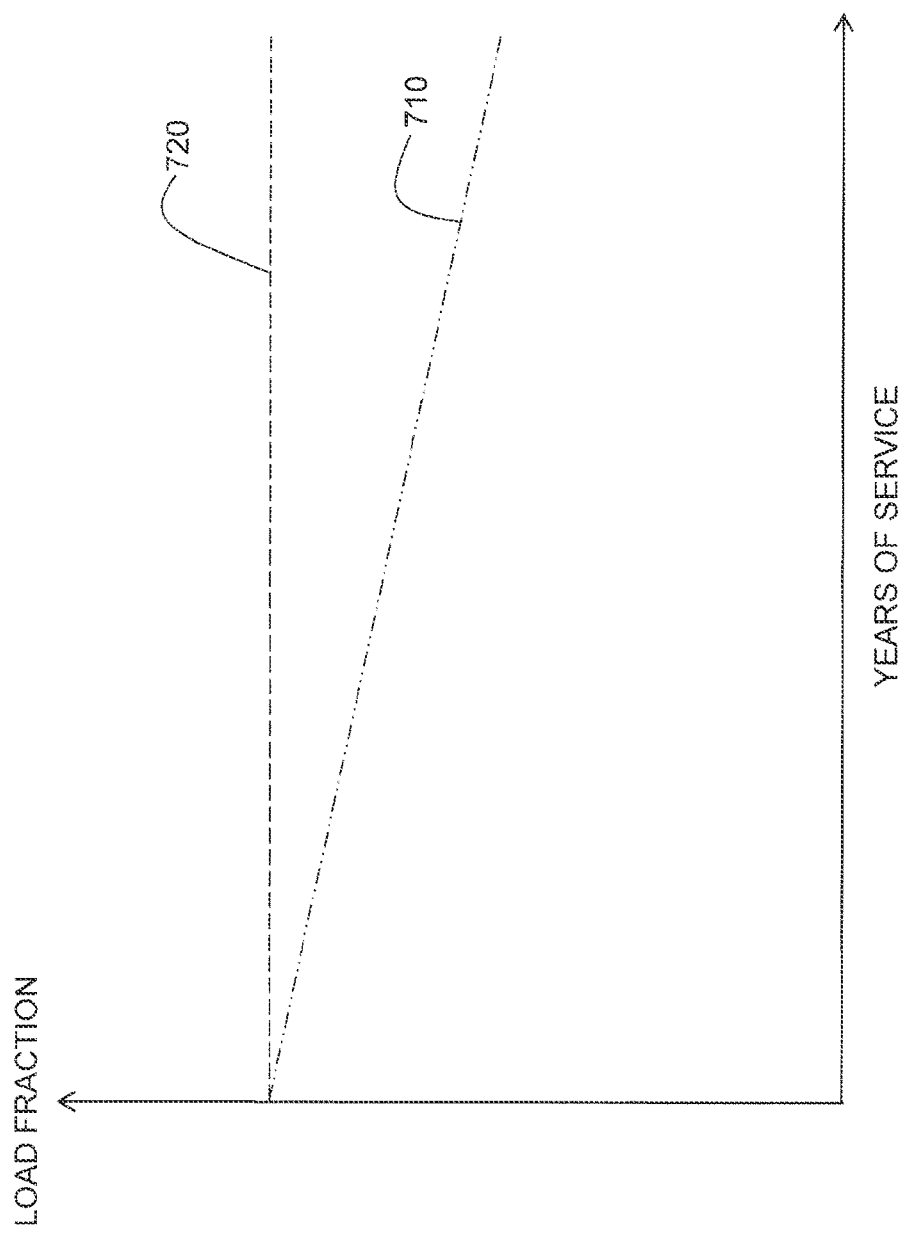
FIG. 7 provides a graph illustrating a comparison of load fraction of a generator of a hybrid generator-battery power system versus years of service.

FIG. 7 provides a graph illustrating a comparison of load fraction of a generator of a hybrid generator-battery power system 100 versus years of service. Load fraction=(recharge power+base load)/(max rating of generator). Therefore, as the recharge period shortens and the discharge energy per day increases, the subsequent load fraction of the generator supplying the recharge load increases. For a typical generator, as the load fraction increases, so does the efficiency of the generator. Therefore, fuel savings is proportional to energy discharged/(time discharged+time recharged). In general, embodiments of the present invention attempt to maintain the sum of recharge power and base load at a relatively high average level by adjusting the PSOC setpoints.

For a system that does not employ the fuel saving methods described herein, the load fraction of the generator tends to decrease over time as shown in the plot 710 of FIG. 7. For a system that does employ the fuel saving methods described herein, the load fraction of the generator remains constant over time, at a relatively high level, as shown in the plot 720 of FIG. 7. Therefore, by adapting the PSOC window as described herein, the load fraction of the generator of the EGS 120 can be maintained according to the plot 720.

Figure 8:
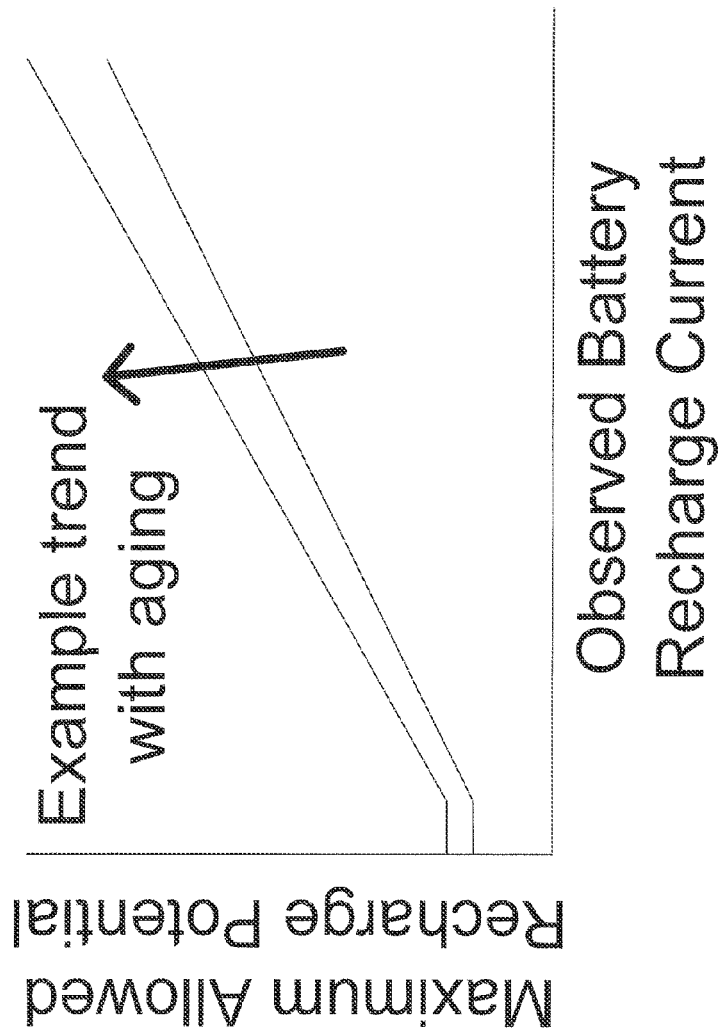
FIG. 8 provides a graph illustrating an example embodiment of how a recharge potential (voltage) applied to a battery power source of a hybrid generator-battery power system is controlled with respect to recharge current and age of the battery.

FIG. 8 provides a graph illustrating an example embodiment of how a recharge potential (voltage) applied to a battery power source 140 of a hybrid generator-battery power system 100 is controlled with respect to recharge current and age of the battery. Application of a higher recharge potential (voltage) to the battery power source 140 when the recharge current is large results in a more consistent potential at the reaction front (the chemistry) of the battery. The reasoning for this increase in potential is based on the fact that elevated currents cause potential drops in parasitic series resistances within the wiring, current collectors, and other parasitic elements within the battery power source 140, leaving less potential to be applied for recharging the battery power source 140.

An embodiment of the present invention compensates for these parasitic resistance losses by elevating the applied voltage when the recharge current is high (e.g., when a recharge resistance value of the energy storage device is below a resistance threshold value), thus applying a consistent potential across the chemistry of the battery power source 140 to help maintain faster recharging (i.e. reduce recharge times). When the recharge current subsequently becomes lower (e.g., when a recharge resistance value of the energy storage device is above the resistance threshold value), the energy storage device may continue to be charged by lowering the applied voltage. Alternatively, the energy storage device may instead be discharged when the recharge resistance value is above the resistance threshold value. This series resistance compensation methodology is provided by the controller 190 based on the voltage and current feedback information from the battery power source 140.

This series resistance compensation of the recharge potential is different than the conventional method of applying a constant high voltage to accelerate recharge. Applying a constant high voltage can lead to over-potential stress on the battery chemistry at light recharge currents, which compromises the health of the battery. Again, as shown in FIG. 8, the curve of applied recharge potential vs. recharge current tends to shift upward over time to compensate for parasitic resistance terms which may be increasing as the battery ages, thus maintaining the cathode potential of the battery power source at a consistent level (i.e., maintaining the potential across the chemistry of the battery power source).

In accordance with an embodiment of the present invention, the methodologies of adapting the PSOC window of the battery power source 140 and adapting the recharge potential applied to the battery power source 140 are combined to provide even further fuel savings. For example, referring to FIG. 5, as the battery power source 140 is being recharged over a time $T_c$ between setpoints 511 and 512, the controller 190 starts the applied recharge potential at a higher level (e.g., 58 volts) at setpoint 511, since the recharge current is higher at setpoint 511, and gradually reduces the applied recharge potential to a lower level (e.g., 56 volts) at setpoint 512 as the recharge current decreases.

Figure 9:
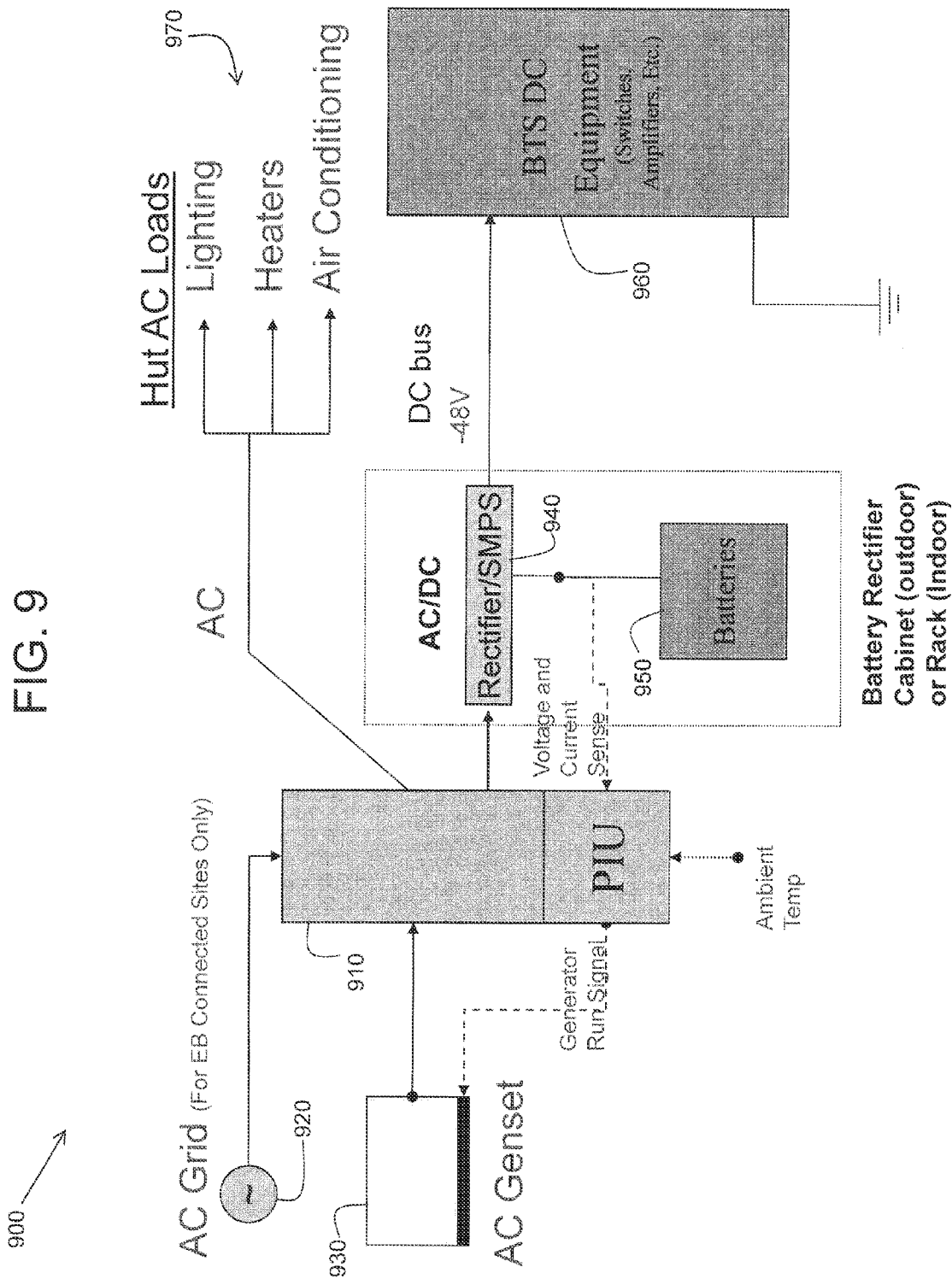
FIG. 9 is an illustration of a second embodiment of a hybrid generator-battery power system for a telecommunications application showing a first control architecture in which the fuel saving methods described herein can be implemented.

FIG. 9 is an illustration of a second embodiment of a hybrid generator-battery power system 900 for a telecommunications or other application showing a first control architecture in which the fuel saving methods described herein can be implemented. In the embodiment of FIG. 9, a power interface unit (PIU) 910 acts a controller which implements the fuel saving methods and control logic described herein. Also, in the embodiment of FIG. 9, AC power (from an AC grid 920 or an engine-generator set 930) is converted to DC power by a rectifier/switched-mode power supply (SMPS) 940. The SMPS 940 is an electronic power supply that incorporates a switching regulator providing highly efficient conversion of electrical power. DC power out of the rectifier/SMPS 940 is used to charge the batteries 950 and drive the DC load 960 (e.g., a BTS). When the engine-generator set 930 is off, the batteries 950 provide DC power to the DC load 960. AC power is provided to the AC loads 970 from the AC grid 920 or the engine-generator 930 via the PIU 910.

Figure 10:
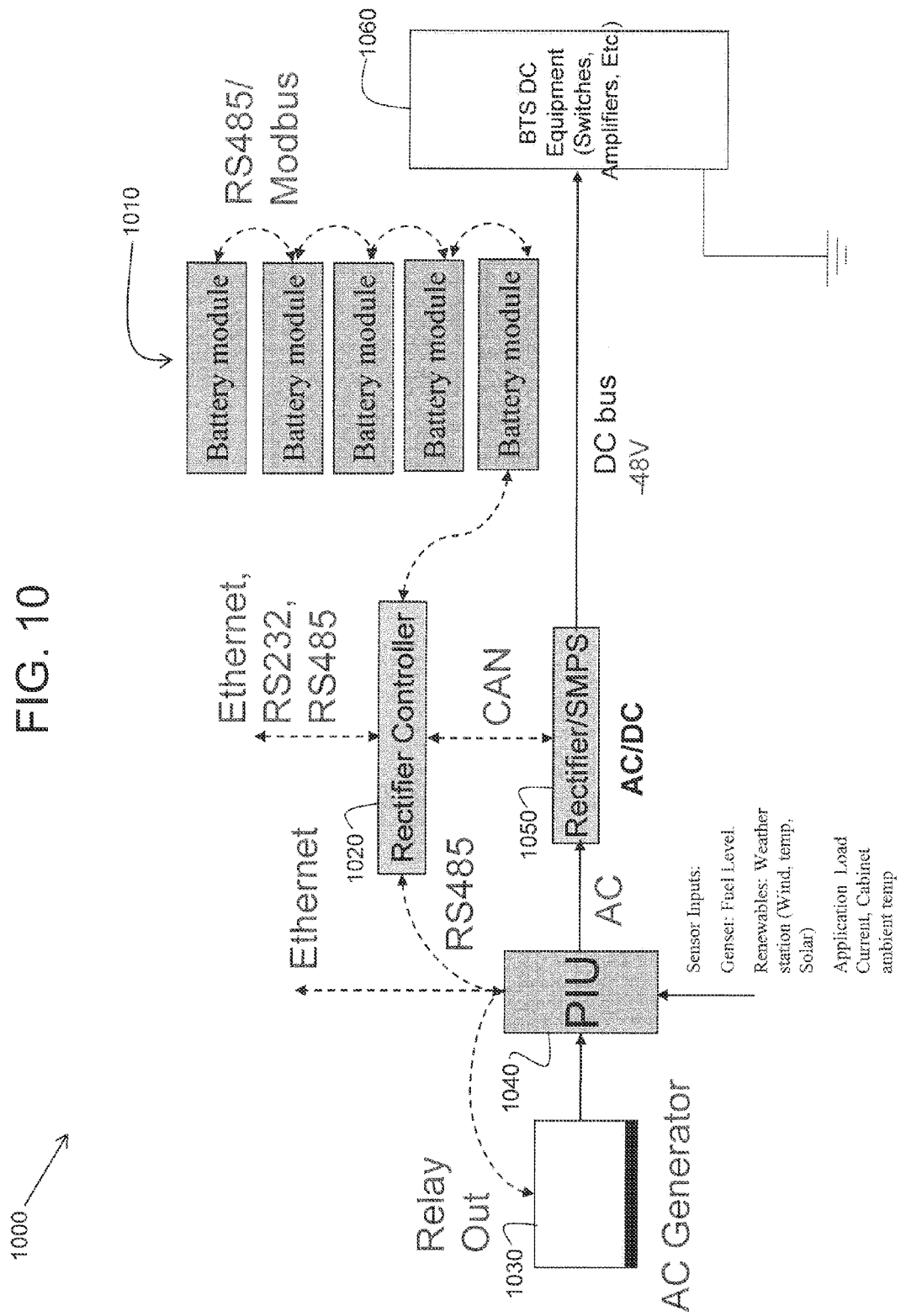
FIG. 10 is an illustration of a third embodiment of a hybrid generator-battery power system for a telecommunications application showing a second control architecture in which the fuel saving methods described herein can be implemented.

FIG. 10 is an illustration of a third embodiment of a hybrid generator-battery power system 1000 for a telecommunications or other application showing a second control architecture in which the fuel saving methods described herein can be implemented. The embodiment of FIG. 10 is more battery-centric than the embodiment of FIG. 9. That is, the embodiment of FIG. 10 provides a plurality of battery modules 1010 that are configured to communicate with each other (e.g., via RS485/Modbus) and with a rectifier controller 1020. The system 1000 of FIG. 10 also includes an engine-generator 1030, a PIU 1040, a rectifier/SMPS 1050, and a BTS 1060, similar to the system 900 of FIG. 9. In general, the embodiment of FIG. 10 provides a more sophisticated communication architecture than the embodiment of FIG. 9, allowing inter-battery module communication of state-of-health, power performance capability characteristics, and SOC operating ranges. Such inter-battery communication may allow for better operation, control, and balancing of the battery modules. The rectifier controller 1020 provides communication between the battery modules 1010 and the PIU 1040, and also communicates with the rectifier/SMPS to provide control of the AC/DC power conversion. Also, the PIU 1040 is configured to receive a plurality of sensor inputs. Interfaces and communication between the various elements of the system 1000 may be provided via Ethernet, R232, RS485, Modbus, and CAN protocols, for example.

Figure 11:
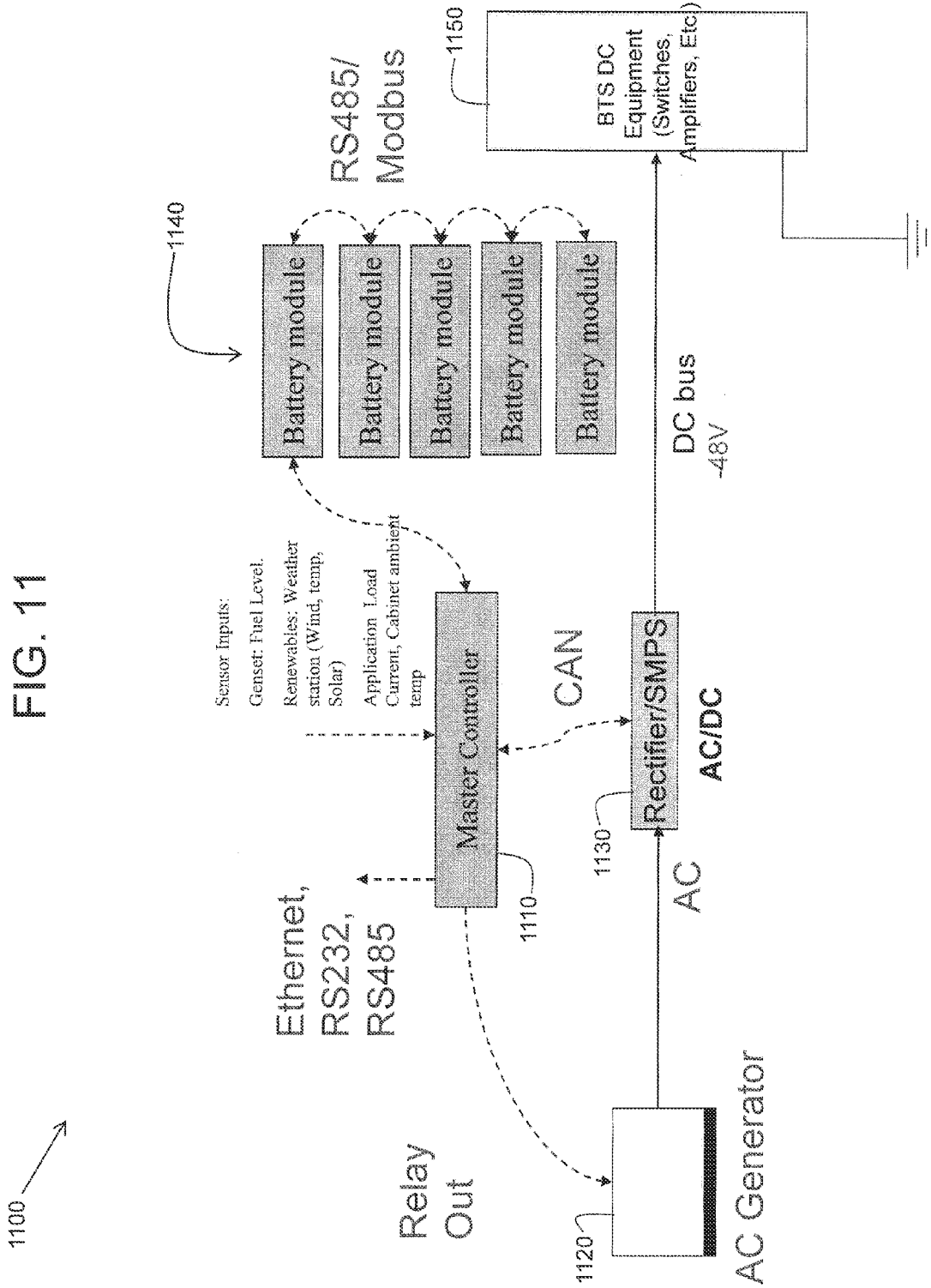
FIG. 11 is an illustration of a fourth embodiment of a hybrid generator-battery power system for a telecommunications application showing a third control architecture in which the fuel saving methods described herein can be implemented.

FIG. 11 is an illustration of a fourth embodiment of a hybrid generator-battery power system 1100 for a telecommunications or other application showing a third control architecture in which the fuel saving methods described herein can be implemented. The embodiment of FIG. 11 goes a step beyond the embodiment of FIG. 10 by eliminating the PIU and the rectifier controller, and providing a master controller 1110 that communicatively interfaces with an engine-generator 1120, a rectifier/SMPS 1130, and a plurality of battery modules 1140. The master controller 1110 is configured to receive a plurality of sensor inputs. Again, interfaces and communication between the various elements of the system 1100 may be provided via Ethernet, R232, RS485, Modbus, and CAN protocols, for example. The DC load (e.g., BTS 1150) is still driven by the rectifier/SMPS 1130.

In general, the progression from the embodiment of FIG. 9 to the embodiment of FIG. 10 to the embodiment of FIG. 11 pushes towards a more consolidated, more sophisticated architecture which is easier to maintain, more cost effective, and more centrally controlled.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method, comprising:
   affecting a change, over time, in a recharge resistance of at least one energy storage device of a hybrid power system comprising the energy storage device and at least one engine;
   determining how a fuel burn rate of the at least one engine-generator set is affected by the recharge resistance change; and
   mapping fuel burn rate of the at least one engine to a plurality of windows of partial states-of-charge (PSOC) of the at least one energy storage device based on the determining;
   identifying a partial state-of-charge (PSOC) window of the plurality of partial state-of-charge windows of the at least one energy storage device, based on the mapping, that reduces the fuel burn rate of the at least one engine; and
   operating an energy storage device over the identified PSOC window.

2. A method, comprising:
   estimating an effect of a change in a recharge resistance of an energy storage device on a fuel burn rate of an engine of a system comprising the energy storage device and the engine using a model of the system;
   mapping the fuel burn rate to windows of partial states-of-charge (PSOC) of the energy storage device based on the estimating;
   indentifying a particular partial state-of-charge (PSOC) window of the energy storage device, based on mapping, that provides a minimal fuel burn rate of the engine as a function of electrical power output of a generator coupled to the engine; and
   operating an energy storage device over the identified PSOC window.

3. A system. comprising:
   an energy storage device configured to store DC electrical power and provide DC electrical power to a DC load;
   a regulator operatively connected to the energy storage device and configured to convert AC electrical power, from an AC electrical power source, to DC electrical power and provide the DC electrical power to the energy storage device and/or to the DC load; and
   a controller in communication with the energy storage device and the regulator, and operable to:
   store at least one of a determined profile or map of recharge resistance value versus charge state of the energy storage device, and
   determine a charge window of operation of the energy storage device, based on the at least one of the profile or the map, which conserves fuel or other energy used by the AC electrical power source, the charge window of operation having lower state of charge setpoint and an upper state of charge setpoint.

4. The system according to claim 3, wherein the energy storage device comprises a battery power source.

5. The system according to claim 3, wherein the controller is further operable to cyclically turn the AC electrical power source on and off based on the charge window of operation.

6. The system according to claim 3, wherein the controller is further operable to determine the at least one of the profile or the map by monitoring potential and recharge current of the energy storage device during operation of the system.

7. The system according to claim 3, wherein the controller is further operable to:
   direct the regulator to apply a first recharge potential to the energy storage device when a determined recharge resistance value of the energy storage device is below a resistance threshold value; and
   direct the regulator to apply a second recharge potential to the energy storage device, which is lower than the first recharge potential, when the determined recharge resistance value of the energy storage device is above the resistance threshold value.

8. The system according to claim 7, wherein the controller is further operable to determine the recharge resistance value of the energy storage device by monitoring potential and recharge current of the energy storage device during operation of the system.

9. The system according to claim 3, wherein the AC electrical power source comprises an engine and generator set that is configured to generate AC electrical power.

10. The system according to claim 3, wherein the AC electrical power source comprises a wind energy system.

11. A system comprising:
    an energy storage device configured to store DC electrical power and provide DC electrical power to a DC load;
    a regulator operatively connected to the energy storage device and configured to condition DC electrical power, from a DC electrical power source, and provide the DC electrical power to the energy storage device and/or to the DC load; and
    a controller in communication with the energy storage device and the regulator, and operable to:
    store at least one of a determined profile or map of recharge resistance value versus charge state of the energy storage device, and
    determine a charge window of operation of the energy storage device, based on the at least one of the profile or the map, which conserves energy produced and/or stored by the DC electrical power source, the charge window of operation having a lower state of charge setpoint and a upper state o charge setpoint.

12. The system according to claim 11, wherein the energy storage device comprises a battery power source.

13. The system according to claim 11, wherein the controller is further operable to cyclically turn the DC electrical power source on and off based on the charge window of operation.

14. The system according to claim 11, wherein the controller is further operable to determine the at least one of the profile or map by monitoring potential and recharge current of the energy storage device during operation of the system.

15. The system according to claim 11, wherein the controller is further operable to:
   direct the regulator to apply a first recharge potential to the energy storage device when a determined recharge resistance value of the energy storage device is below a resistance threshold value; and
   direct the regulator to apply a second recharge potential to the energy storage device, which is lower than the first recharge potential, when the determined recharge resistance value of the energy storage device is above the resistance threshold value.

16. The system according to claim 15, wherein the controller is further operable to determine the recharge resistance value of the energy storage device by monitoring potential and recharge current of the energy storage device during operation of the system.

17. The system according to claim 11, wherein the DC electrical power source comprises a solar energy system.

18. The system according to claim 11, wherein the DC electrical power source comprises a fuel cell energy system.

* * * * *